United States Patent
Herrmann (10) Patent No.: US 8,327,288 B1
(45) Date of Patent: Dec. 4, 2012

(54) SYSTEMS AND METHODS FOR FACILITATING THE DISPLAY AND USE OF DISPLAYED OBJECTS IN CONTENT CREATION ENVIRONMENTS

(75) Inventor: Eric Herrmann, Mill Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 657 days.

(21) Appl. No.: 12/544,446

(22) Filed: Aug. 20, 2009

(51) Int. Cl.
*G06F 3/048* (2006.01)

(52) U.S. Cl. .................. 715/788; 715/765; 715/801

(58) Field of Classification Search .................. 715/764, 715/765, 781, 788, 800, 801
See application file for complete search history.

(56) References Cited

U.S. PATENT DOCUMENTS

| | | | |
|---|---|---|---|
| 5,463,725 | A | 10/1995 | Henckel et al. |
| 5,943,053 | A | 8/1999 | Ludolph et al. |
| 6,002,397 | A | 12/1999 | Jaaskelainen, Jr. |
| 6,088,708 | A | 7/2000 | Burch et al. |
| 6,337,698 | B1 | 1/2002 | Keely |
| 6,694,487 | B1 | 2/2004 | Ilsar |
| 6,788,318 | B2 | 9/2004 | Chen |
| 7,076,733 | B2 | 7/2006 | Smith |
| 7,081,882 | B2 | 7/2006 | Sowden et al. |
| 7,113,190 | B2 | 9/2006 | Heaton |
| 7,248,269 | B2 | 7/2007 | Card et al. |
| 7,500,179 | B2 | 3/2009 | Lehenbauer et al. |
| 7,890,882 | B1 * | 2/2011 | Nelson .......................... 715/788 |
| 2002/0188632 | A1 | 12/2002 | Su |
| 2002/0191027 | A1 * | 12/2002 | Morrow et al. ............... 345/788 |
| 2003/0025737 | A1 * | 2/2003 | Breinberg ..................... 345/801 |
| 2003/0043177 | A1 | 3/2003 | Kawai |
| 2006/0015804 | A1 | 1/2006 | Barton et al. |
| 2007/0006095 | A1 * | 1/2007 | Feng ............................ 715/800 |
| 2007/0162953 | A1 | 7/2007 | Bollinger et al. |
| 2007/0214431 | A1 * | 9/2007 | Amadio et al. ............... 715/788 |
| 2008/0059877 | A1 * | 3/2008 | Brookler et al. .............. 715/264 |
| 2008/0282188 | A1 * | 11/2008 | Hays et al. .................... 715/788 |
| 2008/0295019 | A1 * | 11/2008 | Han et al. ...................... 715/781 |
| 2009/0276726 | A1 * | 11/2009 | Allen et al. ................... 715/784 |
| 2010/0275152 | A1 * | 10/2010 | Atkins et al. ................. 715/788 |

OTHER PUBLICATIONS

U.S. Appl. No. 11/546,002, filed Oct. 10, 2006, Jaramillo.
U.S. Appl. No. 10/927,963, filed Aug. 27, 2004, Mitnick.
U.S. Appl. No. 11/175,114, filed Jul. 5, 2005, Reid et al.
Wayback Machine, "W3schools Division Tutorial" http://web.archive.org/web/20030801072752/http://www.w3schools.com/tags/tag_div.asp. Published Aug. 1, 2003, 3 pgs.
Wayback Machine, "W3schools CSS Margin Tutorial" http://web.archive.org/web/20031210134241/http://www.w3schools.com/css/css_margin.asp. Published Dec. 10, 2003, 3 pgs.
Wayback Machine, "W3schools CSS Border Tutorial" http://web.archive.org/web/20031204195615/http://www.w3schools.com/css/css_border.asp Published Dec. 4, 2003, 7 pgs.

* cited by examiner

*Primary Examiner* — Xiomar L Bautista
(74) *Attorney, Agent, or Firm* — Kilpatrick Townsend & Stockton LLP

(57) ABSTRACT

Systems and methods are disclosed for facilitating the display and use of objects in content creation environments, for example, by ensuring minimum object size properties for objects that would otherwise appear small or invisible. Various methods evaluate how to display objects in a collection or arrangement of objects while addressing potential conflicts and paradoxes that might otherwise exist based on the how size properties of the objects are defined in relation to one another. Certain embodiments facilitate improved display of nested containers including those whose size properties are defined as size to content. Certain embodiments also facilitate the improved display of containers whose children's size properties depend upon container size properties.

20 Claims, 5 Drawing Sheets

SYSTEMS AND METHODS FOR FACILITATING THE DISPLAY AND USE OF DISPLAYED OBJECTS IN CONTENT CREATION ENVIRONMENTS

FIELD

This disclosure generally relates to computer software that creates, edits, runs, displays, provides, or otherwise uses electronic content.

BACKGROUND

Computer applications and content often display arrangements of various objects. Objects, whether actually displayed or not, commonly function as containers, meaning that they contain other "child" objects. Such containers are frequently used, for example, to organize a group of child objects spatially. For example, in conventional applications, a child object's position can be defined with respect to its parent object. A child object may be positioned at x=10, y=10 in location coordinates defined inside a container. Some containers position child objects based on absolute positioning, as in the previous example. Others specify child positions using categories. For example, a horizontal box type container can lay out children from left to right. Object size properties (such as width, height, etc.) can also generally be specified with respect to other objects. For example, the width of a child object may be defined as a percentage of the width of its parent. If a canvas type container had a width of 100 pixels, another object could be placed within it and specified to have a width that is 80% of the canvas container's width, which would result in the child object having a width of 80% of 100 pixels or 80 pixels.

Various problems arise if a container size property (e.g., width, height) is unspecified. For example, a dynamically-sized container such as a horizontal box lays its children out from left to right. If five buttons are in the horizontal box, it sizes itself to be approximately five buttons wide and one button high. If the developer then deletes all five buttons, the size of the box could shrink to zero, i.e., it would appear as a zero pixel rectangle. Similarly, if a developer placed a canvas with the default size of 200×200 pixels and deleted the width and height properties, the canvas would then have no width or height. For various reasons, one or more size properties of an object can be set to zero, making the object difficult to work with. Resizing, for example, may be difficult where resize handles are drawn on top of each other. Additionally, inserting components via drag and drop can be difficult if the container has no displayed size.

Various prop-open features are used to attempt to address some of these problems, for example, by enforcing minimum object size properties. However, existing techniques generally fail to address various circumstances in which containers and other objects are used within applications and other content.

SUMMARY

Systems and methods are disclosed for facilitating the display and use of objects in content creation environments, for example, by ensuring minimum object size properties for objects that would otherwise appear small or invisible. Various methods evaluate how to display objects in a collection or arrangement of objects while addressing potential conflicts and paradoxes that might otherwise exist based on how the size properties of the objects are defined in relation to one another. Certain embodiments facilitate improved display of nested containers including those whose size properties are defined as size to content. Certain embodiments also facilitate the improved display of containers whose children's size properties depend upon container size properties.

Systems and methods are disclosed to improve the display of and use of the displayed objects. This may involve "propping open" containers and other objects in specific cases as needed. "Propping open" is used to refer to setting one or more of an object's size properties (perhaps temporarily) to some reasonable minimum size. Once the user overrides this propped-open size by, as examples, explicitly defining a real size, or by inserting an object with a defined size, the propped-open size can be removed. Certain embodiments can address each dimension individually. For example, an application may treat determination of whether X dimension size properties should be propped-open independently of whether Y dimension size properties should also or alternatively be propped-open. In one specific example, an application determines whether to prop open a container's height independent of whether to prop open the container's width. Certain embodiments also address the scenario where an outer sizeless container contains a child that is itself a sizeless container, for example, by propping open the inner container and causing the outer container to have its size computed based on its contents, i.e., based on the propped-open size of the inner container.

Certain embodiments recalculate whether any size properties of any objects in a development environment should be propped open upon a change made in that environment. A change to a child that is inside a container might trigger a change to the container size property and potentially other objects as well. A change to a container that has one or more child components might trigger a change in a child container, the child container's children, or other objects. Additionally, some list containers change their contents and therefore their size based on a property that identifies an object that supplies a list or array of data to be displayed in the container. Such changes could also trigger recalculation of size properties of one or more objects in a development environment. Certain embodiments can also distinguish between object types and provide different or no propping open functionality depending upon object type. For example, an embodiment may ensure that a container is sufficiently propped-open to ensure that the container can be seen and worked with but disregard button type components if such components, for example, because of their definition will never need to be propped-open.

One exemplary method comprises providing a development environment on a computing device, the development environment displaying objects to be included in content being developed. The development environment determines whether size properties of the objects need to be propped-open by determining whether an object property of an object is defined and, if the object property is not defined, determining whether the object contains one or more child objects. If the object contains one or more child objects, the development environment determines whether the one or more child objects require the object property to be propped-open, and, if any child object requires the object property to be propped-open, the development environment sets the object property to a propped-open value.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Figure 1A:
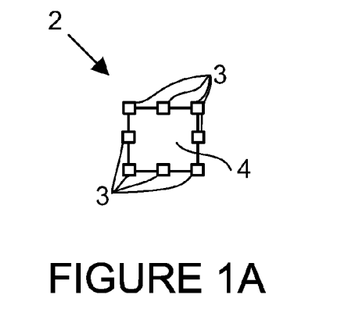
FIGS. 1A-1D illustrate the display of various objects in an exemplary content development environment.
Figure 1B:
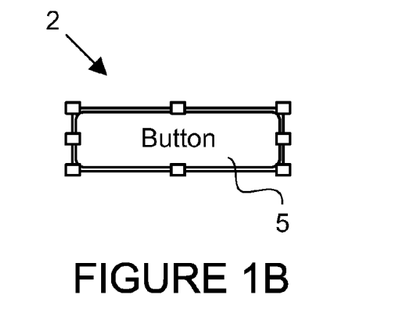

Various prop-open features can facilitate the display and use of objects in content creation environments, for example, by enforcing minimum object size properties. FIG. 1A illustrates a container 2 that is propped-open so that it can be seen and worked within a development environment. In this scenario, both the container 2 length and width size properties have been set to minimum values to ensure that the container 2 can be used. For example, the container is expanded in these dimensions such that each of the size controls 3 can be accessed and the interior 4 of the container 2 is large enough for a user to be able to drag and drop objects into the container 2. For example, a user may drag and drop a button into the container 2. FIG. 1B illustrates a button 3 that is added as a child of the container 2. The container 2 size properties are recalculated and, per the definition of the container type in this example, the container length and width are determined based on the size attributes of the container children, which in this example is the button 3. The container 2 size properties no longer need to be propped-open.

Figure 1C:
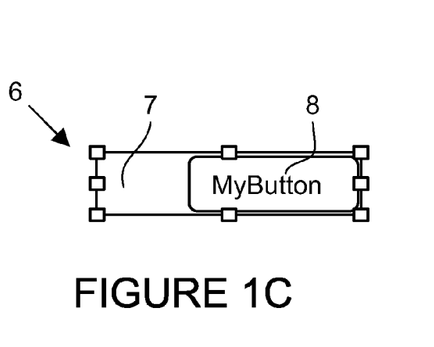

Certain embodiments provide prop-open functionality that addresses specific scenarios of object use. As a specific example, an outer horizontal box (H-Box) may be created and then an inner H-Box and a button may be added as children of the outer H-box. FIG. 1C illustrates how such an object arrangement may be displayed. As shown, a button 8 and an inner H-box 7 are displayed within an outer H-box 6. The inner H-box 7 is propped-open and the outer H-box 8 is sized based on its contents, the inner H-box 7 and the button 8. Certain embodiments further address content being developed that contains nested containers that are all defined as size to content. In such scenarios, the size properties of the containers can be sized so that nested containers do not overlap one another.

Figure 1D:
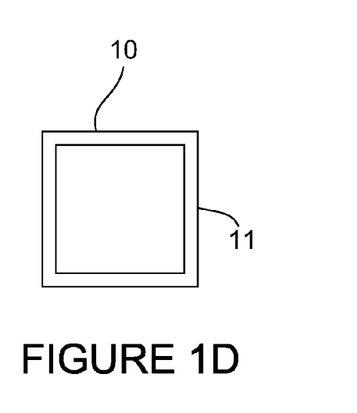

Certain embodiments further address the use of containers for which size depends on child objects and child objects for which size depends on the parent. For example, as shown in FIG. 1D, an inner canvas 10 is defined as a percentage size of the outer canvas 11, while the size of the outer canvas is determined based on the size of its children. This potential paradox can be addressed in various ways. In one exemplary embodiment, the outer canvas 11 is propped-open causing the inner canvas 10 to be sized based on the outer canvas 11 propped-open size. Generally, certain embodiments address potential conflicts and paradoxes by determining whether one or more properties of an object should be propped-open based on certain rules or factors. Accordingly, certain methods disclosed herein provide techniques for evaluating how to prop open and otherwise set size properties for objects in a collection or arrangement of objects while addressing potential conflicts and paradoxes that might otherwise exist based on the how size properties of the objects are defined in relation to one another.

These illustrative examples are given to introduce the reader to the general subject matter discussed herein and are not intended to limit the scope of the disclosed concepts. The following sections describe various additional embodiments and examples.

Illustrative Computing Environment in Which Objects can be Displayed

Figure 2:
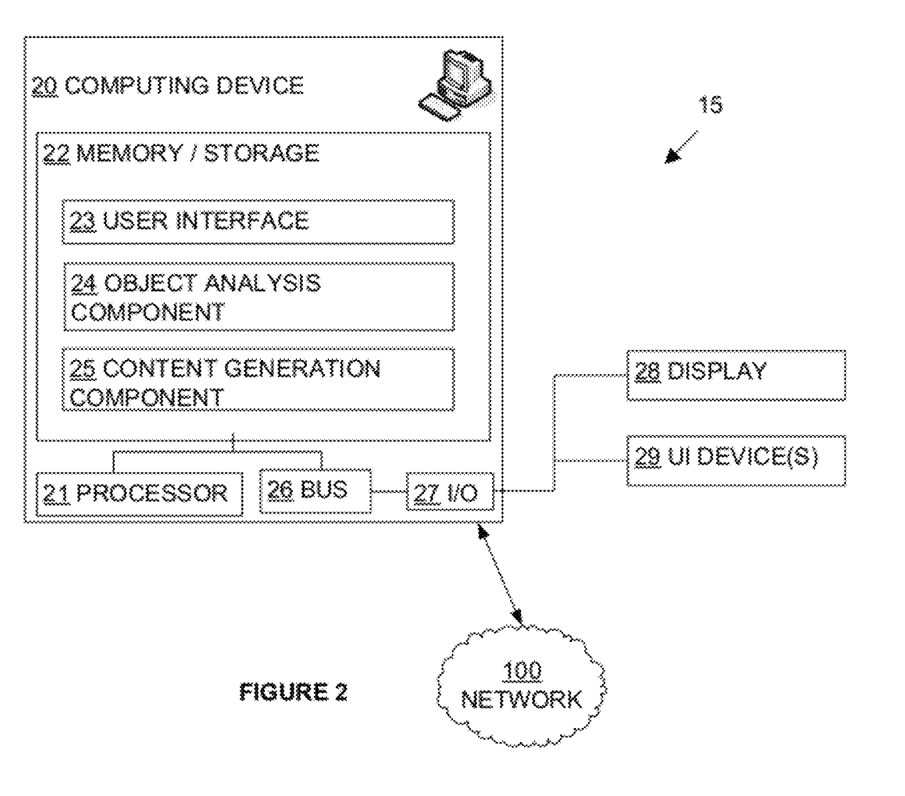
FIG. 2 is a system diagram illustrating an exemplary computing environment.

FIG. 2 is a system diagram illustrating an illustrative computing environment 15 according to certain embodiments. Other embodiments may be utilized. The computing environment 15 shown in FIG. 2 comprises a computing device 20 that is connected to a wired or wireless network 100. Exemplary applications that execute on the computing device 20 are shown as functional or storage components residing in memory 22. The memory 22 may be transient or persistent. As is known to one of skill in the art, such applications may be resident in any suitable computer-readable medium and execute on any suitable processor. For example, the computing device 10 may comprise a computer-readable medium such as a random access memory (RAM) coupled to a processor 21 that executes computer-executable program instructions and/or accesses information stored in memory 22. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The network 100 shown comprises the Internet. In other embodiments, other networks, intranets, combinations of networks, or no network may be used. The computing device 20 may also comprise a number of external or internal devices such as a mouse, a CD-ROM, DVD, a keyboard, a display, audio speakers, or other input or output devices. For example, the computing device 20 includes input output connections 27, connecting a display 28 and various user interface devices 29. The computer device 20, depicted as single computer system, may be implemented as a network of computers, servers, or processors. Examples of a server device are servers, mainframe computers, networked computers, a processor-based device, and similar types of systems and devices.

A computing device, such as exemplary computing device 10, can utilize various functional components to implement one or more of the features described herein. Computing device 20 has a user interface 23 for receiving (and possibly displaying) objects, including, in this example, containers having size properties. Computing device 20 may further have an object analysis component 24 for determining whether and how one or more size properties of one or more objects that are used needs to be propped-open. Various methods can be used to facilitate such determinations and ultimately to facilitate or otherwise improve the appearance and usability of the objects that are placed in content.

In circumstances in which objects are used in content being created, computing device 10 may further have a content generation component 15 that provides objects and/or other aspects of content, typically, by providing such content in a computer-readable medium defining the content. The content can be provided, for example, for display on computing device 10 and/or other electronic devices. Accordingly, one aspect of certain embodiments is facilitating the creation of electronic content that includes objects.

This illustrative computing environment 5 is provided merely to illustrate a potential environment that can be used to implement certain embodiments. Other computing devices and configurations may alternatively or additionally be utilized.

Exemplary Methods of Propping Open Objects

Certain embodiments provide techniques for propping open objects that account for relationships amongst container and child objects. For example, one object's size may be defined as a percentage of the size of another object, such as the object that contains it. Rules can be implemented so that, in the circumstance in which a container's size depends on its children and its children's sizes depend on the parent, a method can determine that even though the parent size normally depends upon the children's size, since all of the children are dependent on the parent's size, the parent will take a propped-open size.

Certain embodiments address circumstances in which components are nested multiple layers. For example, rules can be implemented to address a bunch of objects that are nested within one another with each one specified as 80% of the size of its respective parent. As a specific example, a method may determine that the outermost container object should be propped-open, allowing the other nested objects' sizes to be determined directly or indirectly using that propped-open value. The actual size of a propped-open property (i.e., the minimum value assigned to it) may or may not depend on the context. For example, in the prior example, the propped-open length and width of the outermost container may or may not depend on the number of objects that are nested within it.

Certain other embodiments involve determining whether to prop open an object in a given dimension independently of other dimensions. For example, whether to prop open an object's width may be determined independently from whether to prop open the object's height. For example, an undefined outer canvas-type object may contain an inner canvas-type object that has a defined height (e.g., height=100 pixels) but a width that depends upon the outer object's width (e.g., a 50% of the width of the parent object). The X-dimension (i.e., width) calculations can happen independently of the Y-dimension (i.e., height) calculations. In the X-dimension, the outer canvas width may be propped-open and the inner canvas width may be determined based on that. Separately, in the Y-dimension, since the inner canvas has a set height, the outer canvas can adopt that size or otherwise use the inner canvas height to determine its height.

Figure 3:
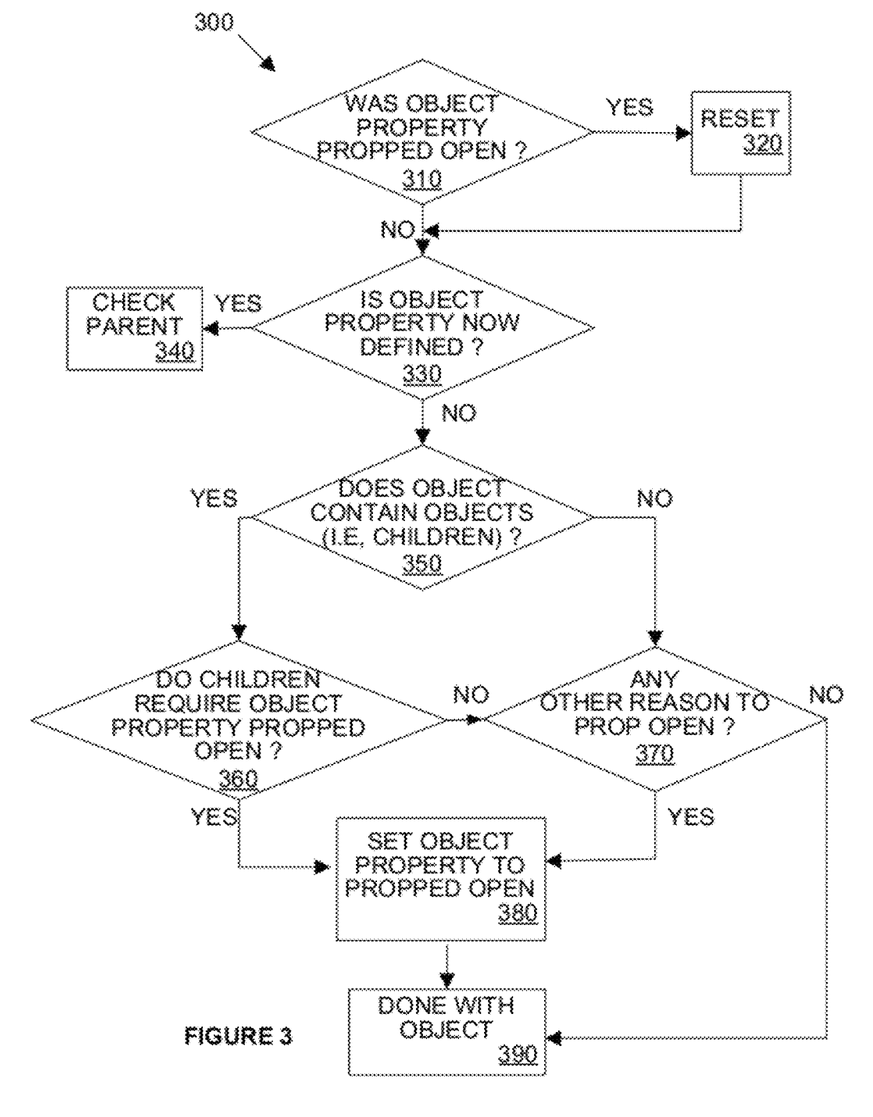
FIG. 3 is a flow chart illustrating an exemplary method of determining whether to prop open an object size property.

FIG. 3 illustrates an exemplary method 300 of determining whether to prop open an object size property, according to certain embodiments. This method 300 or a similar method could be employed to determine whether to prop open an object size property in a single dimension, e.g., to determine the object's width independent of its height or depth. Alternative embodiments could make determinations regarding propping open multiple object size properties simultaneously and/or in ways in which width and height are not calculated independently of one another. This method 300 or a similar method may be employed when a property of an object is changed, when an object is inserted or deleted, or upon any other suitable triggering event which may be appropriate in a given context.

The method 300 involves determining whether the object property was propped-open, as shown in block 310. In other words, this step checks the propped-open status of the property prior to the event that triggers the method. If the object property was propped-open, the method proceeds to block 320 and resets the object property so that the object property is not propped-open and then proceeds to block 330. If the object property was not propped-open in the block 310 determination, then the method 300 proceeds to block 330.

In block 330, the method 300 determines whether the object property is now defined. For example, if the object's width property is set as width=50 pixels then the object's width property is defined. As another example, if the width of the object is set to 80% of the object's parent's width, then that property can be considered defined. If the object property is now defined, the method proceeds to block 340 to check the object's parent object if one exists. The object's parent is checked because the parent might have previously been propped-open and might no longer need to be propped-open. In addition, in the case where the object's property is defined as a percentage, the object's parent should be checked because the parent might need to be propped-open if it is not already. Checking the parent may involve performing method 300 on the parent object itself. Returning to block 330, if the object property is not defined, then the method proceeds to block 350.

In block 350, the method 300 determines whether the object contains any other objects, i.e., child objects. If not then the method proceeds to block 370. If the object does contain one or more child objects, then the method proceeds to block 360, where the method 300 determines whether any child requires the property to be propped-open. A specific example of this type of determination is provided with respect to FIG. 4. Generally, in certain embodiments, a child will not require its parent to propped-open if the child itself has a fixed size that does not depend upon the parent.

If the method 300 determines that no child requires the object to be propped-open then the method 300 proceeds to block 370, where the method 300 determines if there is any other reason to prop open the object. If one or more children require the object property propped-open as determined by block 360 or if there is any other reason to prop open the object property as determined in block 370 then the method proceeds to block 380. If not the method 300 proceeds to block 390 and is done with the object.

In block 380, the method 300 sets the object property to propped-open. The actual value (e.g., pixel value, measurement, etc.) of the propped-open property can be a set minimum value or may be a minimum that is determined based on the object type and/or any other suitable consideration. Once the object property has been set to propped-open the method proceeds to block 390 and is done with the object.

Generally, the exemplary method 300 could be performed in a variety of contexts. For example, the method 300 could be used in a development environment provided on a computing device such as computing device 20 of FIG. 2. As a specific example, the method 300 could be performed by the object analysis component 24 as part of a determination of whether and how one or more size properties of one or more objects that are used in content being created need to be propped-open.

Figure 4:
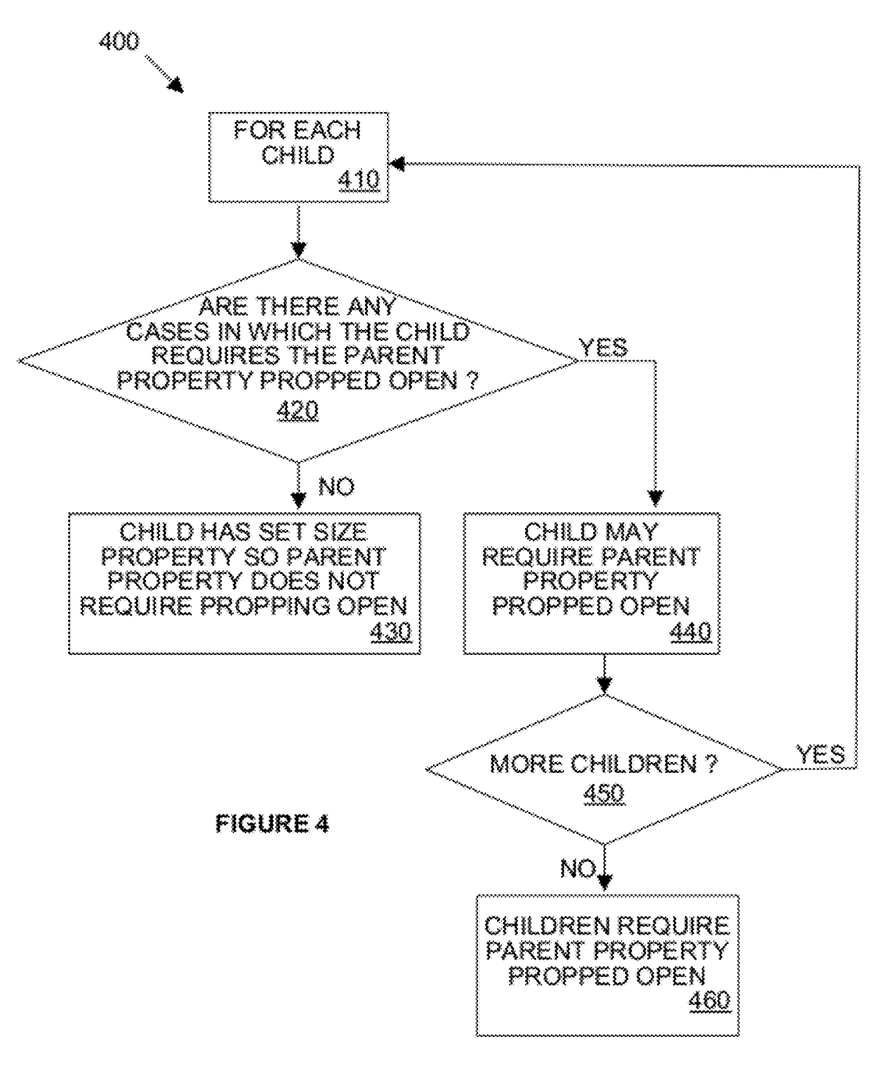
FIG. 4 is a flow chart illustrating an exemplary method of determining whether any child of an object requires a property of the object to be propped-open.

FIG. 4 provides an exemplary method 400 of determining whether any child of an object requires a property of the object to be propped-open, such as the determination made in block 360 of FIG. 3. Block 410 illustrates that the method 400 is performed for each child. In block 420 the method determines if, for a given child, there are any cases in which the child requires the parent property propped-open.

Generally, in this example, if a container object with no size contains several children, and if any one of those children has a set size (i.e., a size that does not depend upon the parent size), then the container does not need to be propped-open because it will have some minimum size determined from that child's size. A child's size may depend upon its parent's property size if the child property is defined as a percentage of the parent's property. Additionally, a child size property may be restricted by a constraint that uses the parent property size, such as, for example, defined based on the parent having a margin or defined as having sides that are ten pixels away from the parent's left and right sides. One exemplary technique for determining whether there are any cases in which a child requires a parent property propped-open is provided in FIG. 5, as described below.

Returning to FIG. 4, if the result of block 420 is "NO," then the method 400 proceeds to block 430 because the method 400 has determined that a child has a set property size and accordingly that the parent property does not require propping open. On the other hand, if the result of block 420 is "YES" then the method 400 has determined that that child being examined does not require the parent property propped-open, as shown in block 440, and the method 400 proceeds to block 450.

In block 450, the method 400 determines whether there are more children of the parent that need to be examined. If there are more children then the method 400 returns to block 410 and repeats the method 400 for the next child. If there are no more children, then the method 400 proceeds to block 460 because the method 400 has determined that the children require the parent property to be propped-open.

Figure 5:
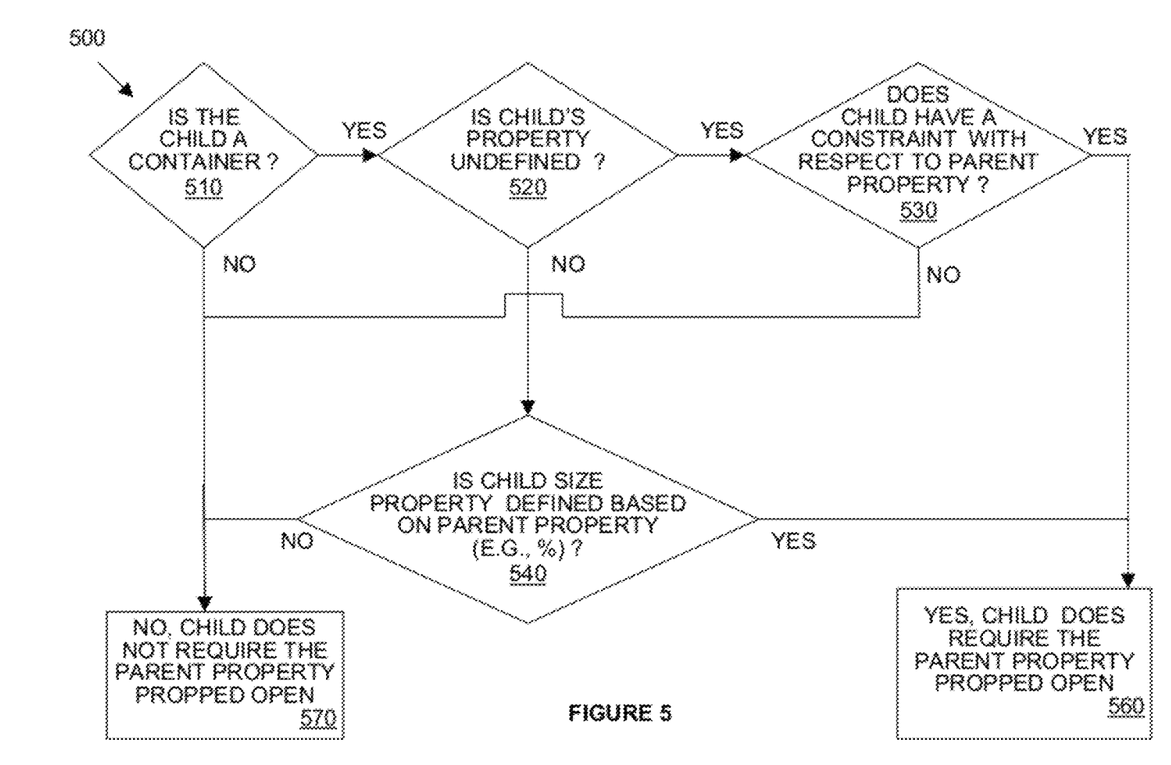
FIG. 5 is a flow chart illustrating an exemplary method for determining whether there are any cases in which a child requires a parent property propped-open.

FIG. 5 is a flow chart illustrating an exemplary method 500 for determining whether there are any cases in which a child requires a parent property propped-open. This method is an example of the determination that could be used for block 420 of FIG. 4.

The exemplary method 500 shown in FIG. 5 begins with a determination of whether the child is itself a container, as shown in block 510. Generally, in this example, if the child is not itself a container the method 500 assumes that its size is set or otherwise not dependent upon the parent. In certain embodiments this assumption may not be appropriate. However, in certain circumstances non-container objects such as button's will never need to be propped-open because, for example, button objects may always have a minimum size. Thus, in certain embodiments, the cases for propping open a container are limited to where the container is empty or contains other empty containers. However, alternative embodiments may involve propping open containers and other objects in other circumstances.

If the child is a container, the method 500 proceeds to block 520 and determines if the child's property is undefined. If its property is undefined, the method proceeds to determine if the child has any constraints (e.g., left/right margins) with respect to the parent property, as shown in block 530. If the child does have constraints, then the method 500 has determined that the child property is dependent upon the parent and thus that the child requires the parent property propped-open, as shown in block 560. For example, the child may be a container with an undefined size that is not defined or constrained with respect to the parent. In this example, the child could itself be propped-open, but it does not separately require the parent property propped-open for purposes of method 500. If the child does not have constraints in the block 530 determination, then the method 500 has determined that the child property is not dependant upon the parent and thus that the child does not require the parent property to be propped-open, as shown in block 570.

Returning to block 520, if the method 500 determines that the child property is defined, the method 500 proceeds to block 540 to examine how the child property size is defined. In block 540, the method 500 determines whether the child property size is defined as dependent upon or otherwise based upon the parent size (e.g., as a percentage size) or is defined in some other way that is not so dependent (e.g., as a fixed value). If the child property is defined as a percentage size or is otherwise based on the parent property, then the child property is determined by the parent and the method proceeds to block 560 indicating that the child does require the parent property to be propped-open. For example, the child may be an empty container that is defined to have a width that is 70% of the parent width. In this instance, the method 500 determines that that child requires the parent container to be propped-open, perhaps overriding a determination that the parent's size is determined by its content's size. If the child property is not defined as a percentage size or otherwise based on the parent property, then the child property is not determined by the parent and the method proceeds to block 570 indicating that the child does not require the parent property to be propped-open.

General

Numerous specific details are set forth herein to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
providing a development environment on a computing device, the development environment displaying objects to be included in content being developed, wherein the development environment determines whether to prop open size properties of the objects by:
determining whether an object property of an object is defined;
if the object property is not defined, determining whether the object contains one or more child objects;
if the object contains one or more child objects, determining whether the one or more child objects require the object property to be propped-open; and
if any child object requires the object property to be propped-open, setting the object property to a propped-open value.

2. The method of claim 1 further comprising:
if none of the child objects requires the object property to be propped-open, setting the object property based at least in part on the one or more child objects.

3. The method of claim 2, further comprising, if the object property is defined, determining whether the property of the parent needs to be propped-open.

4. The method of claim 1 wherein determining whether the one or more child objects require the object property to be propped-open comprises:

for each child object, determining whether the child object has a property that depends upon the object property; and if any of the child objects has a property that does not depend upon the object property, determining that the object property is not required to be propped-open.

5. The method of claim 4 wherein determining whether the child object has a property that depends upon the object property comprises:

determining whether the child object is a container, wherein if the child object is not a container, the child object does not have a property that depends upon the object property;

if the child object is a container, determining whether the property of the child object is undefined;

if the property of the child object is undefined, determining whether the child object has any constraints with respect to the object property, wherein, if the child object does have constraints, the property of the child object is dependant upon the object property, and if the child object does not have constraints, the property of the child object is not dependent upon the object property; and if the property of the child object is defined, determining whether the property of the child object is defined as dependent upon the object property, wherein, if the property of the child object is defined as dependent upon the object property, the property of the child object is dependant upon the object property and, if the property of the child object is defined as dependent upon the object property, the property of the child object is not dependant upon the object property.

6. The method of claim 1, wherein a child will not require its parent to be propped-open if the child itself has a fixed size that does not depend upon the parent.

7. The method of claim 1 wherein determining whether the object property is defined comprises determining that the object property is defined because the object property is set to a value or is set to a percentage of a property of a parent.

8. The method of claim 1 further comprising determining whether the object property was previously propped-open and, if so, resetting the object property.

9. The method of claim 1 further comprising determining whether there is any other requirement to prop open the object property and, if there is any other requirement to prop open the object property, setting the object property to the propped-open value.

10. The method of claim 1 wherein the propped-open value is a preset minimum value.

11. The method of claim 1 wherein the propped-open value is determined based on object type of the object.

12. An apparatus comprising:

a computing device configured to execute via a processor instructions stored on a computer readable medium to provide a development environment displaying objects to be included in content being developed, wherein the development environment determines whether size properties of the objects need to be propped-open by:

determining whether an object property of an object is defined;

if the object property is not defined, determining whether the object contains one or more child objects;

if the object contains one or more child objects, determining whether the one or more child objects require the object property to be propped-open; and if any child object requires the object property to be propped-open, setting the object property to a propped-open value.

13. The apparatus of claim 12 wherein, if none of the child objects requires the object property to be propped-open, the development environment sets the object property based at least in part on the one or more child objects.

14. The apparatus of claim 12 wherein the development environment determining whether the one or more child objects require the object property to be propped-open comprises:

for each child object, determining whether the child object has a property that depends upon the object property; and if any of the child objects has a property that does not depend upon the object property, determining that the object property is not required to be propped-open.

15. The apparatus of claim 14 wherein the development environment determining whether the one or more child objects require the object property to be propped-open comprises:

for each child object, determining whether the child object has a property that depends upon the object property; and if any of the child objects has a property that does not depend upon the object property, determining that the object property is not required to be propped-open.

16. The apparatus of claim 15 wherein the development environment determining whether the child object has a property that depends upon the object property comprises:

determining whether the child object is a container, wherein if the child object is not a container, the child object does not have a property that depends upon the object property;

if the child object is a container, determining whether the property of the child object is undefined;

if the property of the child object is undefined, determining whether the child object has any constraints with respect to the object property, wherein, if the child object does have constraints, the property of the child object is dependent upon the object property, and if the child object does not have constraints, the property of the child object is not dependant upon the object property; and if the property of the child object is defined, determining whether the property of the child object is defined as dependent upon the object property, wherein, if the property of the child object is defined as dependent upon the object property, the property of the child object is dependant upon the object property and, if the property of the child object is defined as dependent upon the object property, the property of the child object is not dependant upon the object property.

17. A non-transitory computer-readable medium on which is encoded program code, the program code comprising:

program code for providing a development environment on a computing device, the development environment displaying objects to be included in content being developed, wherein the development environment determines whether size properties of the objects need to be propped-open by:

program code for determining whether an object property of an object is defined;

program code for, if the object property is not defined, determining whether the object contains one or more child objects;

program code for, if the object contains one or more child objects, determining whether the one or more child objects require the object property to be propped-open; and program code for, if any child object requires the object property to be propped-open, setting the object property to a propped-open value.

18. The computer-readable medium of claim 17, the program code further comprising:

program code for, if none of the child objects requires the object property to be propped-open, setting the object property based at least in part on the one or more child objects.

19. The computer-readable medium of claim 17, wherein determining whether the one or more child objects require the object property to be propped-open, comprises:

for each child object, determining whether the child object has a property that depends upon the object property; and if any of the child objects has a property that does not depend upon the object property, determining that the object property is not required to be propped-open.

20. The computer-readable medium of claim 19, wherein determining whether the child object has a property that depends upon the object property comprises:

determining whether the child object is a container, wherein if the child object is not a container, the child object does not have a property that depends upon the object property;

if the child object is a container, determining whether the property of the child object is undefined;

if the property of the child object is undefined, determining whether the child object has any constraints with respect to the object property, wherein, if the child object does have constraints, the property of the child object is dependant upon the object property, and if the child object does not have constraints, the property of the child object is not dependant upon the object property; and if the property of the child object is defined, determining whether the property of the child object is defined as dependent upon the object property, wherein, if the property of the child object is defined as dependent upon the object property, the property of the child object is dependant upon the object property and, if the property of the child object is defined as dependent upon the object property, the property of the child object is not dependant upon the object property.

* * * * *